United States Patent [19]

Zediker et al.

[11] Patent Number: 5,222,095
[45] Date of Patent: Jun. 22, 1993

[54] RIB ETCHED LENS

[75] Inventors: Mark S. Zediker, Florissant, Mo.; Jeffrey R. Heidel, Red Bud, Ill.

[73] Assignee: McDonnell Douglas Corporation, St. Louis, Mo.

[21] Appl. No.: 860,162

[22] Filed: Mar. 30, 1992

[51] Int. Cl.$^5$ .............................. H01S 3/19; G02B 6/18
[52] U.S. Cl. ..................................... 372/108; 385/131; 372/45
[58] Field of Search ............................ 372/108, 45, 46; 385/131

[56] References Cited

U.S. PATENT DOCUMENTS

| | | | |
|---|---|---|---|
| 4,780,879 | 10/1988 | Chinone et al. | 372/108 |
| 5,084,895 | 1/1992 | Shimada et al. | 372/108 |
| 5,157,746 | 10/1992 | Tobita et al. | 385/131 |
| 5,175,788 | 12/1992 | Miura et al. | 385/131 |
| 5,179,566 | 1/1993 | Iwano et al. | 372/22 |

*Primary Examiner*—James W. Davie
*Attorney, Agent, or Firm*—Guy R. Gosnell; Benjamin Hudson, Jr.; Timothy H. Courson

[57] ABSTRACT

A semiconductor device structure capable of expanding a laser beam in one-dimension, collimating an expanding beam or focusing a nearly collimated beam. This semiconductor structure is typically comprised of three portions: a rib waveguide portion to propagate a beam of light in the quantum well region beneath the rib, an expansion region which incorporates a wider rib structure to allow the propagating beam to expand, and a rib etched lens portion to collimate the expanded beam of light. The shape of the rib etched lens portion is determined by Fermat's principle such that the optical pathlengths travelled by each ray of light are equated at a collimation plane positioned tangentially with the surface of the rib etched lens at the point at which an on-axis beam of light would strike the surface of the rib etched lens. Once the surface of the rib etched lens has been determined by Fermat's principle, the actual, maximum width of the rib etched lens is determined by Snell's law because at some point the amount of divergence is so great that the ray of light exiting the rib etched lens surface is not able to be refracted parallel to an on-axis ray. The rib etched lens may be utilized in alternative configurations requiring a lens element to focus and collimate light propagating therein. Such alternative configurations include the use of a pair of rib etched lenses positioned about a waveguide segment and a pair of expansion segments to form a laser resonator.

12 Claims, 1 Drawing Sheet

RIB ETCHED LENS

BACKGROUND OF THE INVENTION

This invention relates generally to semiconductor structures designed to produce a collimated output having a high power level and more particularly to semiconductor structures incorporating a lens element therein to collimate the output light and expand the output aperture.

In numerous applications, collimated beams of high power laser output are desired such as communication lasers, high energy laser systems and orbital power transfer systems. In previous semiconductor laser devices, a limiting factor on the ability to produce an output beam of high power has been the limit imposed by the maximum power density allowed at the emitting facet of the laser. If the semiconductor laser should be operated so that the power emitted from the laser exceeded the maximum power density at the emitting facet of the laser, the semiconductor laser structure itself could be damaged. In order to increase the available output power levels, of semiconductor laser devices, the surface area of the emitting facet may be increased such that a larger amount of power could be output while not exceeding the maximum power density level at the emitting facet. One method of increasing the surface area of the emitting facet is by increasing the width of the stripe, but for strip widths much greater than 5 $\mu$m the modes tend to breakup and filamentation dominates. This effect produces a wider beam divergence than one would expect for the respective stripe width because while the filaments each operate in their own single mode, the ensemble of filaments that make up the beam are incoherent. The filamentation in broad stripe devices can be controlled, however, by adding optical elements to the cavity. The optical elements can be designed to form a stable resonator cavity or an unstable resonator cavity. While there has been some experimental success with stable resonator designs at low power levels, unstable resonator designs may theoretically be scaled to even higher power levels. However, additional optical elements must be fabricated and aligned for such cavities which adds to the complexity of the design while making it non-monolithic.

An additional problem with utilizing semiconductor lasers in many applications is the need to collimate the output of the laser. In many instances, separate collimation elements must be utilized to collimate the slow axis and the fast axis of the semiconductor laser in order to maintain fundamental mode operation.

In an attempt to decrease the use of distinct collimation elements, previous devices have attempted to integrate the optical elements upon the substrate forming the laser. Such prior art devices attempted to direct or form the beam by making deep etches into the semiconductor structure. These etches would typically be made to a depth, below that at which the optical power was circulating. Thus, for a typical semiconductor laser structure, the etch would be made such that it was deeper than the quantum well and its associated confinement layers. Such deep etches are designed to refract the propagating wave. A problem associated with using the semiconductor surface to refract the light when forming a beam is the roughness of the etched surface. With reference to GaAs semiconductor layers an example, the optical index of GaAs is approximately 3.5 while the surface flatness required for a smooth optical lens is a variation of $\lambda 100$ or less. For a waveguide propagating light having a wavelength of 800 nm, the wavelength in the GaAs material would be (800 nm/3.5) or 228 nm. Thus, the surface flatness required for such a refracting deep etch surface is $+/-$ (22.8 nm/100) or $+/-22.8$ Angstrom. The fabrication of such a smooth surface has not yet been achieved by current processing techniques.

Therefore, it would be desirable for a semiconductor structure to serve both as a waveguide for the transmitted lightwave as well as a lens element for the slow axis of the laser resonator. Furthermore, it would be desirable if such an integral lens element could be formed with a minimal number of additional processing steps. It would be desirable if such a semiconductor waveguide structure could be used as a conventional one-dimensional optic element that would allow the collimation of expanding modes, as well as being utilized in the design of both conventional and unique laser resonators.

SUMMARY

There is provided by this invention a semiconductor device structure capable of expanding a laser beam in one-dimension, collimating an expanding beam or focusing a nearly collimated beam. This semiconductor structure is typically comprised of three distinct portions. A rib waveguide portion is typically comprised of an AlGaAs semiconductor material system, although it may be comprised of other semiconductor materials as is well known to those skilled in the art. The rib waveguide portion serves to propagate a beam of light in the quantum well region beneath the rib. Abutting to the rib waveguide portion is an expansion region which incorporates a much wider rib structure to allow the propagating beam to expand. The rib forming the expansion region may either be a rib having a constant width with such constant width substantially greater than that of the rib waveguide or may be a tapering rib with the width of the expansion region increasing in a direction away from the interface of the rib waveguide and the expansion region with the amount of taper greater than the maximum amount of divergence of the propagating beam. Abutting the expansion region is a rib etched lens portion which serves to collimate the expanded beam of light. The expanded, collimated beam of light may thus transmit greater power levels than previously allowed since the expanded beam of light decreases the power density at the emitting facet so as to not injure the surface of the emitting facet by exceeding the maximum power density level. Additionally, there is no need for a collimating lens for the slow axis of the semiconductor laser device as the rib etched lens portion of the semiconductor device collimates the light in the slow axis internally.

The shape of the rib etched lens portion is determined by application of Fermat's principle such that the optical pathlengths travelled by each ray of light are equated at a collimation plane positioned tangentially with the surface of the rib etched lens at the point at which an on-axis beam of light would strike the surface of the rib etched lens. By equating the optical pathlengths, the divergent light is insured to be collimated at any plane parallel to the collimation plane. Once the surface of the rib etched lens has been determined through application of Fermat's principle, the actual, maximum width of the rib etched lens is determined by use of Snell's law because at some point the amount of divergence is so great that the ray of light exiting the rib etched lens surface is not able to be refracted parallel to an on-axis ray. At this maximum width, total internal reflectance occurs and the rib etched lens is incapable of collimating these rays. The angular value at which total internal reflectance begins to occur is termed the critical angle. The point at which the critical angle is reached determines the interface between the expansion region and the rib etched lens portion as well as the maximum width of both the expansion region and the rib etched lens portion.

Additionally, the point at which the critical angle is reached determines the maximum amount of magnification and the lengths of both the expansion region and the rib etched lens region, once a total length for the two regions is selected by the designer. Varying levels of magnification and varied lengths and widths of the semiconductor device may be utilized depending upon the particular application involved. Greater values of magnification may be desired in some instances which results in a longer semiconductor device so as to allow the diverging beam to expand to such an amount. Such greater magnification may be desired, for example, in applications requiring a high power output in which the greater magnification serves to further decrease the power density at the emitting facet of the semiconductor device such that the emitting facet is not destroyed by exceeding the maximum power density level allowable at the facet.

The rib etched lens, described in conjunction with the waveguide segment and the expansion segment, may be utilized in alternative configurations requiring a lens element to focus and collimate a lightwave propagating therein. Such alternative configurations include the use of a pair of rib etched lenses positioned about a waveguide segment and a pair of expansion segments to form a laser resonator.

DETAILED DESCRIPTION OF THE PREFERRED EMBODIMENT

Figure 1:
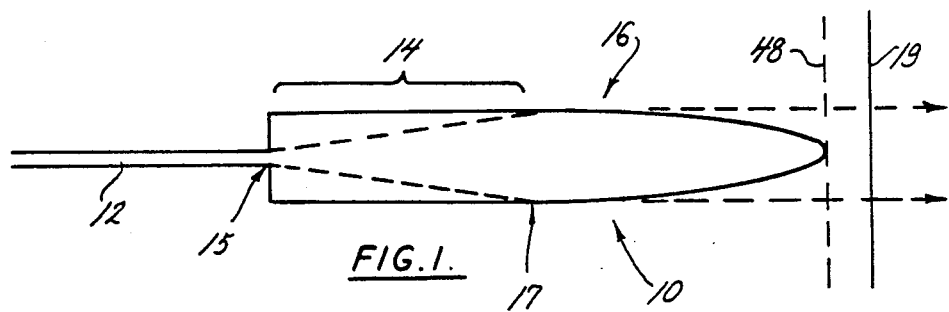
FIG. 1 is an exemplary plan view of the top surface of a semiconductor device incorporating the principles of this invention illustrating the shape of the rib structure and the path of divergent light rays.
Figure 2:
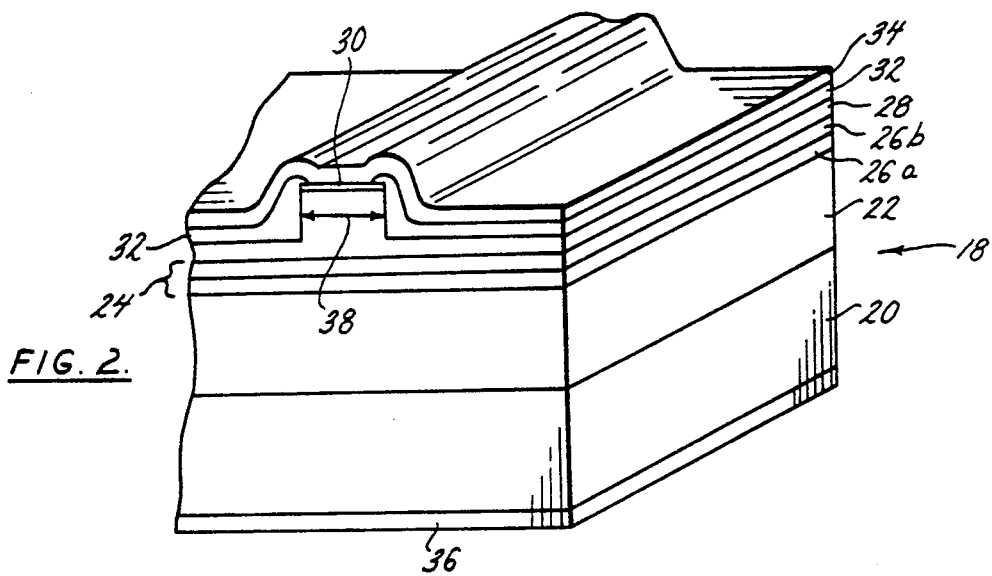
FIG. 2 is a cross sectional view of the semiconductor device forming the rib waveguide portion as shown in FIG. 1.

Referring to FIG. 1, there is shown an exemplary plan view of a semiconductor laser waveguide 12 incorporating an expansion region 14 and a rib etched lens 16 for producing a high power, collimated output. The semiconductor structure 10 illustrated in FIG. 1 is constructed with typical semiconductor materials and processes as shown in cross-section in FIG. 2. FIG. 2 illustrates the typical semiconductor layers comprising the semiconductor waveguide structure 12. While the structure may be comprised of any of a variety of materials and have varied physical dimensions as is required by the particular application, an AlGaAs semiconductor structure will be described in more detail as an example.

The ribbed GaAs semiconductor waveguide 18 shown in FIG. 2 is fabricated upon an N+ doped AlGaAs substrate 20 upon which an N-doped AlGaAs cladding layer 22 has been deposited. An active region 24 surrounded by a pair of graded index confinement layers 26 is subsequently deposited upon the N-doped AlGaAs cladding layer 22. The active region 24, typically comprised of a single quantum well of GaAs, is positioned between a pair of graded index confinement layers 26 typically comprised of $Al_xGa_{1-x}As$. As is well known to those skilled in the art the graded composition of the confinement layers 26 varies the percentage of aluminum and gallium in the confinement layers 26 such that there is a variance in the layer's index of refraction. The percentage of aluminum of the confinement layers 26 decreases as the interface of the confinement layer and the quantum well is approached while at the interface of the confinement layer and the cladding layer, the percentages of aluminum are typically equal in the two adjoining layers. Upon the active region 24 and its associated confinement regions 26, a P-doped AlGaAs cladding layer 28 is deposited followed by a P+ doped GaAs contact layer 30. Following the deposition of the P+ GaAs contact layer 30, the semiconductor structure is patterned and photolithographically etched using conventional semiconductor processing technology to form the desired ribbed structure. An isolation layer 32, typically silicon dioxide or silicon nitride, is subsequently deposited upon the patterned surface of the semiconductor structure. The isolation layer 32 is in turned patterned and photolithographically etched to expose the center portion of the P+ GaAs contact layer 30. Following the etching of the isolation layer 32, a first P-metalization layer 34 is deposited on the surface of the P+ GaAs contact layer 30 such that electrical contact can be maintained with the semiconductor structure underlying the rib. The P-metalization 34 overlying the isolation layer 32 is typically comprised of titanium, platinum and gold (Ti/Pt/Au). A second N-metalization layer 36 is applied to the major surface of the N+doped AlGaAs substrate 20 opposite that on which the N-doped AlGaAs cladding layer 22 has been deposited. The N-metalization layer 36 applied to the major surface of the N+ doped AlGaAs substrate 20 is typically comprised of germanium, nickel, and gold (Ge/Ni/Au), such that electrical contact can be maintained with the semiconductor structure.

The ribbed waveguide structure illustrated in FIG. 2 is utilized to form the three distinct portions of the present invention shown in FIG. 1, i.e. the rib waveguide, the expansion region, and the rib etched lens, with only the size and cross-sectional shape of the rib varying. The rib waveguide portion of the semiconductor structure is comprised of the structure shown in FIG. 2 with the width of the rib being generally equal throughout. The actual width 38 of the rib may be varied depending upon the particular application with the diameter of the propagating beam being slightly larger than the width 38 of the rib, i.e. for a 3 micrometer wide rib supports a beam propagating in the active region 24 of the semiconductor structure having a diameter of approximately 4 micrometers.

The expansion region 14 of the semiconductor structure 10 illustrated in FIG. 1 is constructed in an identical fashion to that shown in FIG. 2 with the width 38 of the rib increased in the expansion region 14 in comparison with the width 38 of the rib in the rib waveguide section 12. The ratio of the rib's width in the expansion section 14 to the rib's width in the rib waveguide section 12 may be any suitable value with devices constructed with a larger ratio being capable of outputting higher power levels over those with smaller ratios. Such increased power output is due to the construction of the laser such that the area of the emitting facet 19 will typically have a width equal that of the expansion section 14 such that larger power levels can be delivered by the semiconductor laser without exceeding the maximum power density at the emitting facet 19. The interface 15 of the rib waveguide section 12 and the expansion section 14 may have a distinct step increase from a first constant rib width within the rib waveguide section 12 to a second constant rib width within the expansion section 14 as shown in FIG. 1 or may be a more gradual expansion from the rib's width of the rib waveguide 12 rib to the expanded rib width of the expansion section 14. Even should the interface 15 be a distinct increase in rib width as shown in FIG. 1, the expansion of the propagating beam within the semiconductor structure will expand in an approximately linear fashion as shown in FIG. 1. Thus, the width of the rib within the expansion region 14 need only be as large or slightly larger than the increasing width of the propagating beam.

Following the expansion of the propagating beam, the beam must be collimated in order to maintain fundamental mode operation. As opposed to the utilization of an external collimating lens, the ribbed waveguide structure 10 may be fabricated in such a way that the semiconductor structure itself collimates the slow axis of the propagating beam and maintains fundamental mode operation.

The rib etched lens section 16 of the semiconductor structure 10 is simply a specially shaped rib structure having a varied cross-sectional area which serves to collimate the slow axis of the propagating beam. The exact shape of the ribbed structure which is formed by conventional masking and etching techniques, is determined through the application of Fermat's principle, which insures that the optical pathlengths for all rays of light remain equal. Exemplary calculations in an application of Fermat's principle are hereinafter discussed with reference made therein to FIG. 3, illustrating a portion of the rib etched lens surface 40.

Figure 3:
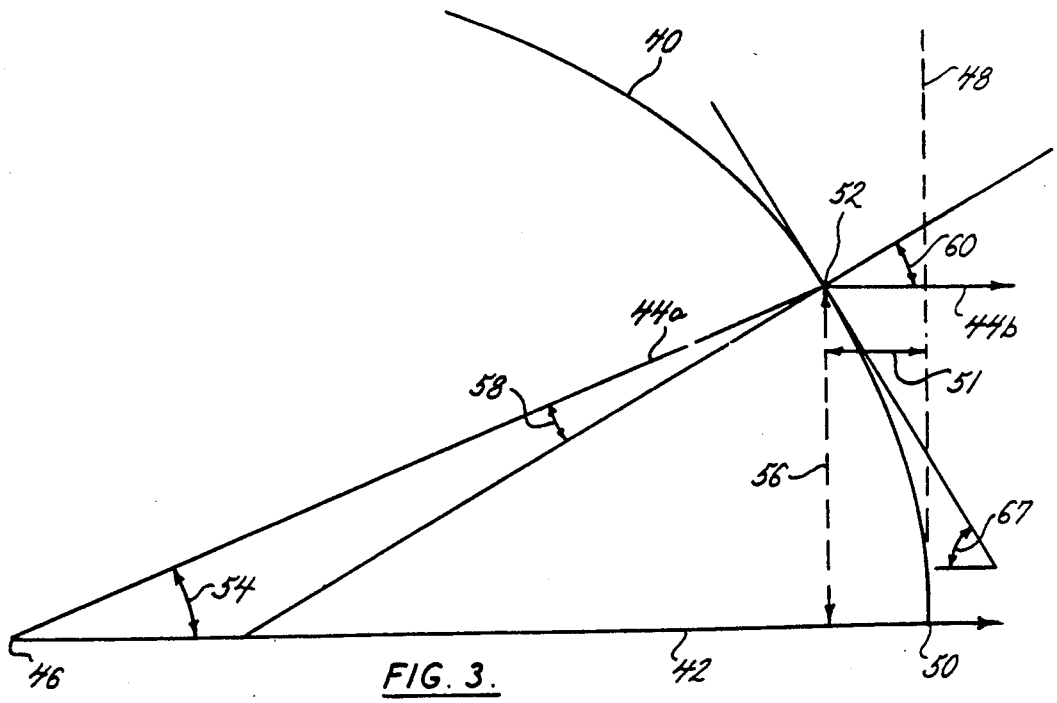
FIG. 3 is a exemplary view of a portion of the rib etched lens surface illustrating the refraction of divergent light rays by the rib etched lens surface.

As an exemplary calculation, equal path lengths will be determined for a pair of light rays; one of which remains on-axis 42 and one of which is an off-axis light ray 44. Each light ray must travel an optical path from the point 46 at which they diverge to the point at which each strikes the collimation plane 48. The collimation plane 48 is a plane parallel to the emitting facet 19 of the semiconductor structure 10. Additionally, the design of the rib etched lens will be such that the collimation plane 48 will be parallel to the emitting facet when it is positioned to tangentially touch the surface 40 of the rib etched lens at the point 50 which is on-axis for the rib waveguide's propagating beam. The initial equation for equating the optical pathlengths of the two light rays is:

$$n_1 R_1 + n_2 x = n_1 R_2 \quad (1)$$

in which $R_1$ is the pathlength from the point of divergence 46 to the point 52 at which the off-axis light ray 44 strikes the surface 40 of the rib etched lens, x, denoted 51 in FIG. 3, is the distance parallel to the on-axis ray 42 from the point at which the off-axis ray 44 strikes the surface 40 of the rib etched lens to the collimation plane 48 and $R_2$ is the distance from the point of divergence 46 to the point 50 at which the on-axis ray 42 strikes the surface 40 of the rib etched lens. Additionally, $n_1$ and $n_2$ are the indices of refraction inside and outside the rib etched lens, respectively.

The formation of a rib structure creates an index of refraction variance between the material underlying the rib structure and material lying outside the rib structure. The index of refraction variance may be calculated for a waveguide operating in fundamental mode by solving the following equation:

$$k_0 d(n_1^2 - n_2^2)^{\frac{1}{2}} = k_0 d(\Delta\epsilon)^{\frac{1}{2}} < \pi \quad (2)$$

wherein $k_0$ is equal to $(2\pi)/\lambda$, wherein $\lambda$ is the wavelength at which the waveguide is propagating light, wherein d is the width of the waveguide, wherein $n_1$ is the index of refraction within the waveguide and $n_2$ is the index of refraction outside the waveguide, and wherein $\Delta\epsilon$ is the change in dielectric constant between the semiconductor structure within the waveguide and that external to the waveguide. As an example, it may be assumed that the waveguide in question is propagating light having a wavelength of 860 nm, although light of any wavelength may utilize a similar rib etched lens, in a ribbed waveguide structure having a width of 3 μm. $\Delta\epsilon$ in such an instance is equal to 0.0205. Utilizing the exemplary values given above, the $\Delta\epsilon$ value may be related to the change of the index of refraction between material within and external to the waveguide structure through the use of the equations as follows:

$$\epsilon_1 = n_1^2 \quad (3a)$$

$$\epsilon_1 + \Delta\epsilon = (n_1 + \Delta n)^2 \quad (3b)$$

$$\Delta\epsilon = 2n_1 \Delta n + (\Delta n)^2 \approx 2n_1 \Delta n \quad (3c)$$

or $$\Delta n \approx (\Delta\epsilon)/2n_1 = 0.003/2(3.5) = 0.003. \quad (3d)$$

Thus, the variance in the index of refraction at the edge of a 3 micrometer wide rib waveguide structure is 0.003. Therefore, if the index of the material underlying the rib waveguide structure is 3.500, the resultant index of the material external to the rib waveguide structure is 3.497. This variance in the index of refraction is due to the etching of the materials comprising of the rib.

Returning therefrom to the application of Fermat's principle, equation (1) may be solved for x with reference to FIG. 3 and the trigonometric identity that $R_1 = (R_2 - x)/\cos\phi_1$ as follows:

$$(n_1 R_2 - n_1 x)/\cos\phi_1 + n_2 x = n_1 R_2 \quad (4a)$$

$$n_1 R_2 - n_1 x + n_2 x \cos\phi_1 = n_1 R_2 \cos\phi_1 \quad (4b)$$

$$x(n_2 \cos\phi_1 - n_1) = n_1 R_2 (\cos\phi_1 - 1) \quad (4c)$$

$$x = (n_1 R_2 (\cos\phi_1 - 1))/(n_2 \cos\phi_1 - n_1). \quad (4d)$$

wherein $\phi_1$, denoted 54 in FIG. 3, is the angle between the on-axis ray 42 and the off-axis ray 44.

Additionally, with reference to FIG. 3, $\phi_1$ may be found to be equal to:

$$\phi_1 = \tan^{-1}(d/(R_2 - x)) \quad (5)$$

wherein d, denoted 56 in FIG. 3, is the perpendicular distance from the on-axis ray 42 to the point 52 at which the off-axis ray 44 strikes the surface 40 of the rib etched lens so that the distance x may be formulated as:

$$x = n_1 R_2 \{\cos(\tan^{-1}(d/(R_2-x))) - 1\}/(n_2\cos(-\tan^{-1}(d/(R_2-x))) - n_1). \quad (6)$$

Thus, by selecting values of x which meet the requirements of equation (6), a pattern for the shape of a rib forming the rib etched lens may be generated which guarantees that the phase of each ray emitted from the rib etched lens will be equal at the collimation plane 48 and thus also equal at the cleaved emitting facet 19. This phase relationship only holds true if the off-axis ray 44 is able to be refracted the required amount so as to be parallel with the on-axis ray 42 upon exiting from the rib etched lens.

In order to determine if the off-axis ray 44 may actually be refracted enough to be parallel with on-axis ray 42, Snell's law:

$$n_1 \sin\Theta_1 = n_2 \sin\Theta_2 \quad (7)$$

must be analyzed wherein in $\Theta_1$, denoted 58 in FIG. 3, is the angle between a line normal to the surface 40 of the rib etched lens at the point 52 at which the off-axis ray 44 strikes the surface 40 and the off-axis ray 44a itself, and wherein $\Theta_2$, denoted 60 in FIG. 3, is the angle between the line normal to the surface 40 at point 52 and the refracted off-axis ray 44b. With reference to FIG. 3, substitutions for the variables in Snell's law above may be made as follows and $\phi_0$, denoted 67 in FIG. 3, be solved for:

$$n_1 \sin(90 - \phi_1 - \phi_0) = n_2 \sin(90 - \phi_0) \quad (8a)$$

$$n_1 \cos(\phi_1 + \phi_0) = n_2 \cos\phi_0 \quad (8b)$$

$$n_1(\cos\phi_1\cos\phi_0 - \sin\phi_1\sin\phi_0) = n_2\cos\phi_0 \quad (8c)$$

$$n_1\cos\phi_1 - n_1\sin\phi_1\tan\phi_0 = n_2 \quad (8d)$$

$$\tan\phi_0 = (n_1\cos\phi_1 - n_2)/(n_1\sin\phi_1) \quad (8e)$$

$$\phi_0 = \tan^{-1}(n_1\cos\phi_1 - n_2)/(n_1\sin\phi_1) \quad (8f)$$

Wherein $\phi_0$ is the smaller of the angles between a line tangent to the surface 40 of the rib etched lens at the point 52 at which the off-axis ray 44 strikes the surface 40 and the on-axis ray 42. The resulting equation gives a slope of the refracting surface, $\phi_0$, as a function of the divergence angle of the off-axis ray $\phi_1$. $\phi_0$ and $\phi_1$ must now be utilized to determine $\Theta_1$ which is equal to:

$$\Theta_1 = 90° - \phi_1 - \phi_0. \quad (9)$$

In order for the rib etched lens to properly function, $\Theta_1$ must be less than or equal to the critical angle, $\Theta c$, as determined from Snell's law as follows:

$$\Theta c = \arc\sin(n_2/n_1). \quad (10)$$

By requiring $\Theta_1$ to be less than or equal to the critical angle, the surface 40 of the rib etched lens may be constructed in accordance to the values of x previously determined since this requirement insures that the resulting off-axis ray 44 may be redirected to be parallel with the on-axis ray 42. As the divergence angle 44 of the off-axis ray 44 increases, $\Theta_1$ approaches the critical angle, $\Theta c$. At the point at which $\Theta_1$ is equal to the critical angle, total internal reflectance will begin to occur such that the rib etched lens structure 16 may not be made wider since the resulting rays will not be refracted parallel with the on-axis ray 42, but instead will be internally reflected within the lens structure 16.

The point at which $\Theta_1$ equals the critical angle is the point which defines the interface between the expansion region 14 of semiconductor structure 10 and the rib etched lens portion 16 as shown in FIG. 1. In order to determine the precise measurements for the device 10, a value for $R_2$ must be selected. $R_2$ is the distance from the interface 15 of the input rib waveguide 12 and the expansion region 14 to the point 50 at which the rib etched lens surface and an on-axis ray 42 of light intersect. Additionally, the value of x at the point at which $\Theta_1$ is equal to the critical angle, $\Theta c$, may be determined from the use of equation (4d). Thus, by determining the difference between $R_2$ and x at the point at which $\Theta_1$ is equal to the critical angle, the length of the expansion region 14 is found. Additionally, the value of x at the point at which $\Theta_1$ is equal to the critical angle is the length of the rib etch lens section 16 of the semiconductor structure 10.

The resultant values of $R_2$ and x, as well as a value of $\phi_1$, all determined at the point when $\Theta_1$ is equal to the critical angle, $\Theta c$, may be utilized to determine the amount by which the beam of light has been expanded. The radius 56 of the expanded beam of light, d, upon its exit from the rib etched lens surface 40 may be determined as follows:

$$d = (R_2 - x)\tan\phi_1 \quad (11)$$

Additionally, the semiconductor device 10 may have the cleaved output emitting facet 19 located at the collimation plane 48 which is positioned tangentially to the rib etched lens surface 40 at the point 50 at which an on-axis ray 42 would strike the rib etched lens surface 40. Alternatively, the emitting facet 19 may be positioned parallel to the collimation plane 48 at any distance therefrom since the light once emitted from the surface 40 of the rib etched lens, is collimated and will retain its phase relationship.

Although any particular lengths and sizes of the semiconductor device 10 may be selected as required by the particular application, an illustration is subsequently provided. As previously determined, a 3 $\mu$m wide AlGaAs rib waveguide 12 propagating light having a wavelength of 860 nm has an index of refraction of 3.500 within the waveguide and 3.497 external to the waveguide. Using a value of $R_2$ of 260 $\mu$m for exemplary purposes, the particular values of x may be determined by an iterative process from values of $\phi_1$ equal to 0° defining an on-axis ray, to $\phi_1$ equal to 90°. The size of the iterative step of $\phi_1$ may be selected by the designer with smaller iterations resulting in a slightly more efficient rib etched lens surface 40. For example, iterative steps of 0.25° may be taken. Additionally, the step size does not need to remain constant throughout the determination of the entire surface 40 of the rib etched lens as for values of $\phi_1$ near 0° greater rates of change are apparent in the surface 40 of the rib etched lens. Thus, smaller iterative steps may be required for smaller values of $\phi_1$ with increasing iterative step sizes as the value of $\phi_1$ increases due to the decrease in the rate of change of the rib etched lens surface 40.

Once a series of values of x has been determined defining the ideal rib etch lens surface 40, the value at which $\Theta_1$ is equal to the critical angle, $\Theta_c$, must be determined in order to determine which portion of the ideal rib etched lens surface 40 defined by the series of x values is capable of refracting the divergent light beams 44 parallel to an on-axis beam 42 so as to effectively collimate the light. For the particular example, the critical angle is 56.8° as determined by equation (10). By equating $\Theta_1$ to this critical angle and solving in turn for $\phi_1$ with equation (9), following the equality noted in equation (8f) for $\phi_0$, the resulting value of $\phi_1$ may be utilized to determine the value of x, from the set of x values previously calculated with equation (4d), at the point at which $\Theta_1$ is equal to the critical angle. Consequently, the rib etched lens surface, may be formed from the point at which x equals 0 to the point at which x equals 236.53 μm, as determined by the critical angle constraint. Since, the value of $R_2$ is equal to the total length of both the expansion region 14 and the rib etched lens section 16 and the length of the rib etched lens section 16 is equal to x, or, 236.53 μm, the length of the expansion section 14 is $R_2-x$, or, 23.47 μm. The amount by which the light beam has been expanded may also be calculated from the values of $\phi_1$, $R_2$ and x at the point of interface 17 between the expansion region 14 and the rib etched lens section 16. Applying using equation (11) the radius of the beam at the interface 17 of the expansion section 14 and the rib etched lens section 16 is approximately 9.96 μm as compared with the value of 2 μm previously determined for the light beam beneath the input rib waveguide 12. Thus, the ratio of magnification of the beam is 9.96/2 or 4.98.

As may be readily apparent from the above exemplary calculations, the length and design of the rib etched lens structure 16 may be varied as required by the application to obtain greater or lesser amounts of magnification with greater amounts of magnification allowing for higher levels of power transmission through the emitting facet 19 as the power of density is decreased by the greater magnification so as to remain less than the maximum allowable power density at the emitting facet 19 of the semiconductor device 10. To allow for greater magnification, the value of $R_2$ selected need only be made larger to allow for the greater expansion while still being capable of collimating the light.

Additionally, the values obtained for x to determine the shape of the rib etched portion 16 of the semiconductor device 10 actually as the rib etched structure 16 is formed by a rib of varying width. Thus, the values of d determined for each value of x corresponding to a $\Theta_1$ value less than the critical angle dictated the resulting width of the rib etched lens structure 16. The value of d at the point when $\Theta_1$ is equal to the critical angle, also determines the maximum width of the expansion section 14. While the width of the expansion section 14 may be equal throughout as shown in FIG. 2 it may also taper somewhat as previously discussed.

Thus, for example, the width of the rib at a point when $\phi_1$ equals 10° and x equals 167.2 μm in the above example is approximately 32.73 μm which is twice the value of d as determined from equation (11) at that value of x. Thus, the values of x and d determined by the above equations determine the shape, length and width of the rib formed at the surface of the semiconductor structure 10 and ultimately controls the collimation and expansion of the propagating wave.

While there has been described in detail a rib etched lens in conjunction with a waveguide structure and an expansion segment, such a rib etched lens may be utilized in other configurations which require the collimation and focusing of a propagating beam. For example, a waveguide segment may be formed between a pair of oppositely disposed expansion segments which are formed, in turn, between a pair of oppositely disposed rib etched lenses. If a pair of facets are thereafter formed and appropriately coated, the resulting semiconductor structure may serve as a laser resonator. As may be determined from this example, such rib etched lenses may be incorporated in various semiconductor structures in place of conventional optical elements such that the entire semiconductor structure may be formed monolithically.

Although there has been illustrated and described specific detail and structure of operations, it is clearly understood that the same were merely for purposes of illustration and that changes and modifications may be readily made therein by those skilled in the art without departing from the spirit and scope of this invention.

What is claimed is:

1. A semiconductor waveguide device, comprising:
   a) a rib waveguide segment comprised of a plurality of semiconductor layers having an active region therein for transverse carrier confinement, said semiconductor layers patterned to define a first ribbed structure, having a first width, with which electrical contact may be maintained for providing lateral carrier confinement;
   b) an expansion segment, positioned adjacent to said rib waveguide segment, comprised of a plurality of semiconductor layers having an active region therein for transverse carrier confinement, said semiconductor layers patterned to define a second ribbed structure, having a second width, with which electrical contact may be maintained for providing lateral carrier confinement, said second width of said second ribbed structure being greater than said first width of said first structure; and
   c) a rib etched lens segment, positioned adjacent to said expansion segment, comprised of a plurality of semiconductor layers having an active region therein for transverse carrier confinement, said semiconductor layers patterned to define a third ribbed structure with which electrical contact may be maintained for providing lateral carrier confinement, said third ribbed structure having a width which varies along the length of said rib etched lens segment with said width of said third ribbed structure selected such that the optical path lengths traveled by said light rays propagating within said semiconductor waveguide device from the interface of said rib waveguide segment and said expansion segment to a collimation plane are equal.

2. A semiconductor waveguide device, as recited in claim 1, wherein said second width of said second ribbed structure is equal to said width of said third ribbed structure at the interface of said expansion segment and said rib etched lens segment.

3. A semiconductor waveguide device, as recited in claim 2, wherein said plurality of semiconductor layers, including said active region, forming each of said rib waveguide segment, said expansion segment, and said rib etched lens segment are coextensive throughout each segment.

4. A semiconductor waveguide device, as recited in claim 3, wherein said collimation plane is selected to be perpendicular to the orientation of said semiconductor layers and positioned to be parallel to a plane tangentially contacting an edge of the third ribbed structure, said tangential contact occurring at a point furthest from said interface of said expansion segment and said rib etched lens segment.

5. A semiconductor waveguide device, as recited in claim 4, further comprising an emitting facet, said emitting facet positioned parallel to said collimation plane.

6. A semiconductor waveguide device, as recited in claim 5, wherein said interface of said expansion segment and said rib etched lens segment is along a plane positioned through points on the edge of said third ribbed structure, said points being the furthest from said interface of said rib waveguide segment and said expansion segment at which total internal reflectance of said propagating light rays from said edge of said third ribbed structure occurs.

7. A semiconductor waveguide device, as recited in claim 6, wherein said second width of said second ribbed structure is constant throughout the length of said expansion segment.

8. A semiconductor waveguide device, as recited in claim 6, wherein said second width of said second ribbed structure is increases in a direction from said interface of said rib waveguide segment and said expansion segment toward said interface of said expansion segment and said rib etched lens segment.

9. A semiconductor waveguide device, as recited in claim 6, wherein said plurality of semiconductor layers forming each of said rib waveguide segment, said expansion segment, and said rib etched lens segment are comprised of alloys of AlGaAs.

10. In conjunction with a semiconductor waveguide, a rib etched lens comprised of a plurality of semiconductor layers having an active region therein for transverse carrier confinement, said semiconductor layers patterned to define a ribbed structure with which electrical contact may be maintained for providing lateral carrier confinement, said ribbed structure forming an effective index of refraction difference between semiconductor material underlying said ribbed structure and semiconductor material external to said ribbed structure said ribbed structure having a width which varies along the length of said rib etched lens with said width of said ribbed structure selected such that the optical path lengths traveled by said light rays propagating within said rib etched lens from the entry of the light rays to said rib etched lens to a collimation plane are substantially equal.

11. In conjunction with a semiconductor waveguide, a rib etched lens, as recited in claim 10, wherein said collimation plane is selected to be perpendicular to the orientation of said semiconductor layers and positioned to be parallel to a plane tangentially contacting an edge of said ribbed structure, said tangential contact occurring at a point furthest from said semiconductor waveguide.

12. In conjunction with a semiconductor waveguide, a rib etched lens, as recited in claim 10, wherein said plurality of semiconductor layers forming said rib etched lens are comprised of alloys of AlGaAs.

* * * * *